US 6,636,741 B2

(12) United States Patent
Yoshioka et al.

(10) Patent No.: US 6,636,741 B2
(45) Date of Patent: Oct. 21, 2003

(54) CELLULAR TELEPHONE WITH AUTOMATED REDIAL FUNCTIONS

(75) Inventors: Kenji Yoshioka, Yokohama (JP); Kazuo Shibuya, Yokohama (JP); Arata Kurosawa, Yokohama (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/533,710

(22) Filed: Mar. 23, 2000

(65) Prior Publication Data

US 2003/0119520 A1 Jun. 26, 2003

(51) Int. Cl.[7] .............................................. H04M 11/00
(52) U.S. Cl. ........................ 455/456; 455/460; 455/564
(58) Field of Search ................................. 455/456, 409, 455/407, 414, 427, 428, 445, 457, 460, 564, 550, 569; 379/216.1, 359, 355.01, 355.02

(56) References Cited

U.S. PATENT DOCUMENTS

| 5,790,639 A | * | 8/1998 | Ranalli et al. ............... 358/407 |
| 5,950,113 A | * | 9/1999 | Meihofer ...................... 455/10 |
| 5,974,131 A | * | 10/1999 | Malik ..................... 379/215.01 |
| 6,078,655 A | * | 6/2000 | Fahrer et al. ........... 379/220.01 |
| 6,148,253 A | * | 11/2000 | Taguchi et al. .............. 370/310 |
| 6,266,543 B1 | * | 7/2001 | Chen ........................... 455/460 |
| 6,275,713 B1 | * | 8/2001 | Toda ........................... 455/460 |
| 6,360,109 B1 | * | 3/2002 | Thauvin et al. .............. 455/564 |
| 6,393,106 B1 | * | 5/2002 | Cannon et al. ............. 379/67.1 |
| 6,393,278 B1 | * | 5/2002 | Buchanan et al. .......... 455/415 |

FOREIGN PATENT DOCUMENTS

JP          08149558 A    *    6/1996    ............ H04Q/7/38

* cited by examiner

Primary Examiner—William Trost
Assistant Examiner—Congvan Tran
(74) Attorney, Agent, or Firm—Parkhurst & Wendel, L.L.P.

(57) ABSTRACT

A cellular telephone apparatus capable of establishing and maintaining a call even in case of a failure in call establishment or a call due to a busy state of a called party or a communications channel disorder such as congestion or received wave level shortage. In response to a request for a call origination for a destination telephone number, a call is originated for the destination telephone number. In case of a failure in the call origination, a call termination process is executed and then the call origination is retried. Once a call is established after the call origination, in response to a detection of disconnection of the call caused not by a user but by a channel disorder, a call termination process executed. A call is originated for the same telephone number as a destination telephone number of the disconnected call. In an embodiment, the retrying is put off while a received wave level is less than a predetermined level. If a count of said call origination reaches a predetermined count value, then the retrying is stopped.

18 Claims, 4 Drawing Sheets

FIG. 2
| ID | TELEPHONE NUMBER | ---- |
|---|---|---|
| ABCD | 012-345-6789 | ---- |
| BCDE | 123-456-1111 | ---- |
|  | 123-456-1112 |  |
|  | 123-456-1113 |  |
| CDEF | 234-567-8901 | ---- |
| ⋮ | ⋮ |  |
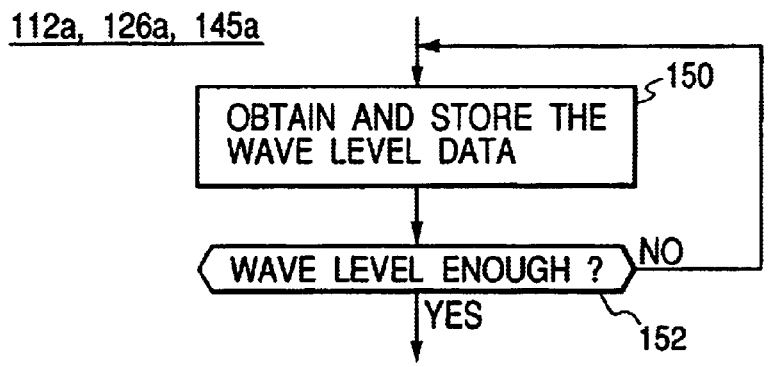
FIG. 4
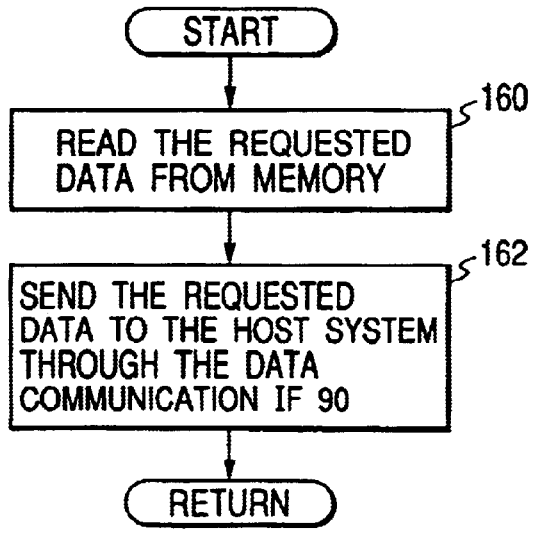
FIG. 5

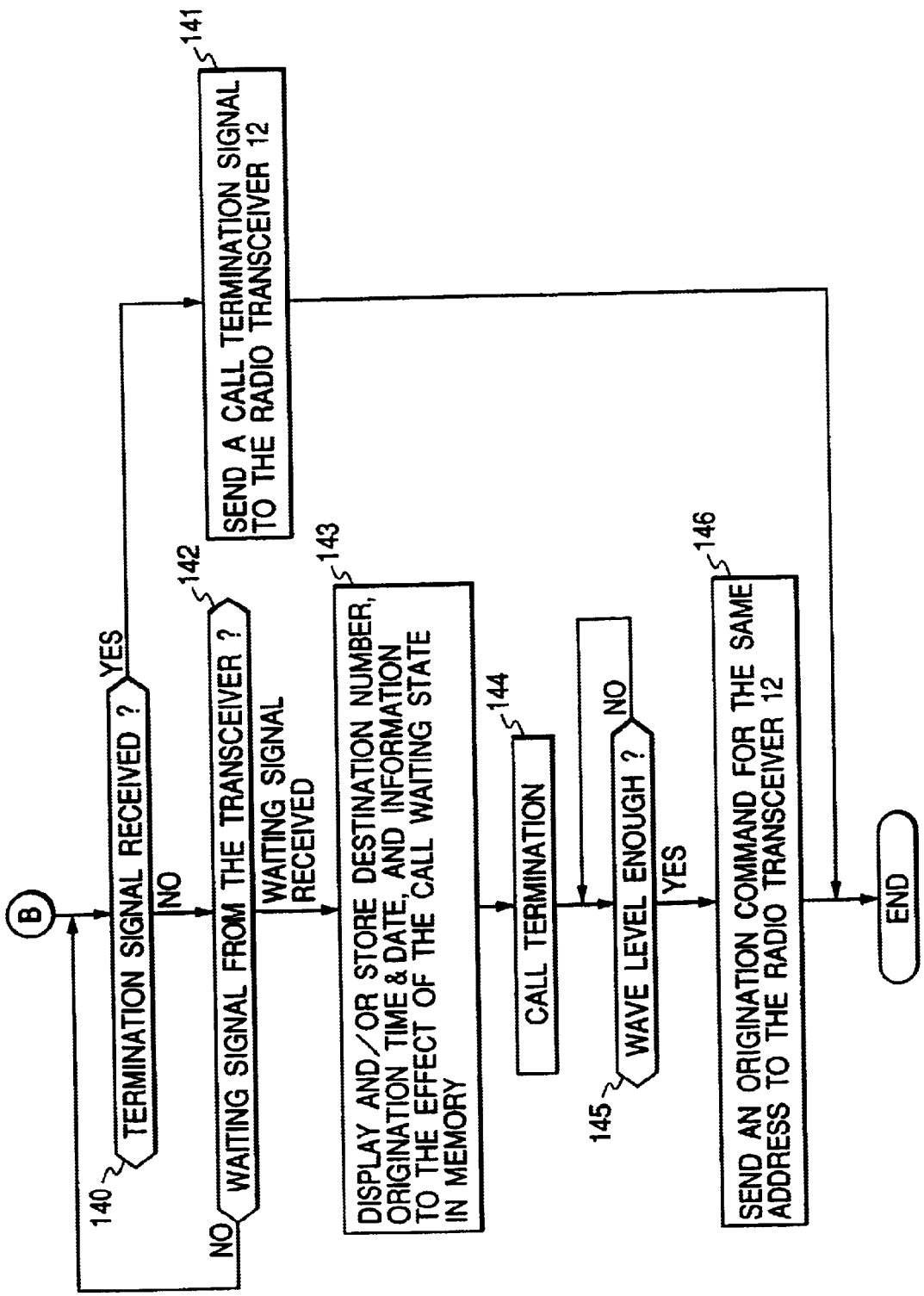

US 6,636,741 B2

CELLULAR TELEPHONE WITH AUTOMATED REDIAL FUNCTIONS

BACKGROUND OF THE INVENTION

1. Field of the Invention

The invention relates to a mobile telephone and, more specifically, to a technique for establishing and maintaining a call by automatic redialing in case of a failure in call establishment or a call due to a communications channel disorder such as congestion or weak wave (i.e., received wave level shortage).

2. Description of the Prior Art

There are a variety of telephone sets that can automatically dial one of telephone numbers previously stored in memory by the user. Some of them redial the last called phone number in response to a predetermined input. Some others dial a phone number either specified by a predetermined operation by the user or associated with an abbreviated number input by the user. Also, U.S. Pat. No. 5,742,666 discloses an emergency mobile telephone. In this system, automatic dialing of an emergency telephone number is initiated by the user pressing a dedicated push button on the cellular telephone handset, or alternatively, upon the occurrence of an accident which is detected by the cellular telephone.

However, there has not been such a cellular telephone as utilizes the automatic redialing function to cope a failure in call establishment such as a busy state of the called party, a congestion or weak wave and to cope with a failure in connection during a call due to congestion or weak wave.

Therefore, it is an object of the invention to provide a technique for establishing and maintaining a call by automatic redialing in case of a failure in call establishment or a call due to a busy state of the called party or a communications channel disorder such as congestion or weak wave.

SUMMARY OF THE INVENTION

The problems of a failure in call establishment or a call due to a busy state of the called party or a communications channel disorder are overcome in accordance with an aspect of the invention. In response to a request for a call origination for a destination telephone number, a call is originated for the destination telephone number. In case of a failure in the call origination, a call termination process is executed and then the call origination is retried.

In a preferred embodiment, the retrying of the call origination is put off while a received wave level is less than a predetermined level.

If a count of said call origination reaches a predetermined count value, then the retrying is stopped.

If the failure is due to a busy state of a called telephone terminal identified by the destination telephone number, a call is originated for a substitution telephone number as the retrying operation. The substitution telephone number is one of telephone numbers associated with a called party identified by the destination telephone number in a telephone directory table. The substitution telephone number is different from the last called telephone number.

If a count of said call origination reaches a predetermined count value, then the retrying is stopped.

Once a call is established after the call origination, in response to a detection of disconnection of the call caused not by a user but by a channel disorder, a call termination process executed. A call is originated for the same telephone number as a destination telephone number of the disconnected call.

According to another aspect of the invention, a cellular telephone apparatus capable of establishing and maintaining a call even in case of a failure in call establishment or a call due to a busy state of a called party or a communications channel disorder is provided in the same way as described above.

According to further aspect of the invention, there is provided a portable system including a cellular telephone means capable of establishing and maintaining a call even in case of a failure in call establishment or a call due to a busy state of a called party or a communications channel disorder. The cellular telephone means has the same features as the cellular telephone apparatus described above. The portable system may include a GPS (global positioning system) or navigation system. The portable system may be a laptop computer.

BRIEF DESCRIPTION OF THE DRAWING

The features and advantages of the present invention will be apparent from the following description of an exemplary embodiment of the invention and the accompanying drawings, in which:

FIG. 2 is a diagram showing an example of a telephone directory table stored in the nonvolatile memory 80 of FIG. 1;

FIG. 4 is a part of flowchart which is executed in place of any of steps 112, 126 and 145; and FIG. 5 is a flowchart showing an operation of the controller 30 under the control of a program (not shown) stored in ROM 32 and executed in response to a request for data transfer from an internal or external host system.

Throughout the drawing, the same elements when shown in more than one figure are designated by the same reference numerals.

DETAILED DESCRIPTION OF THE PREFERRED EMBODIMENTS

Figure 1:
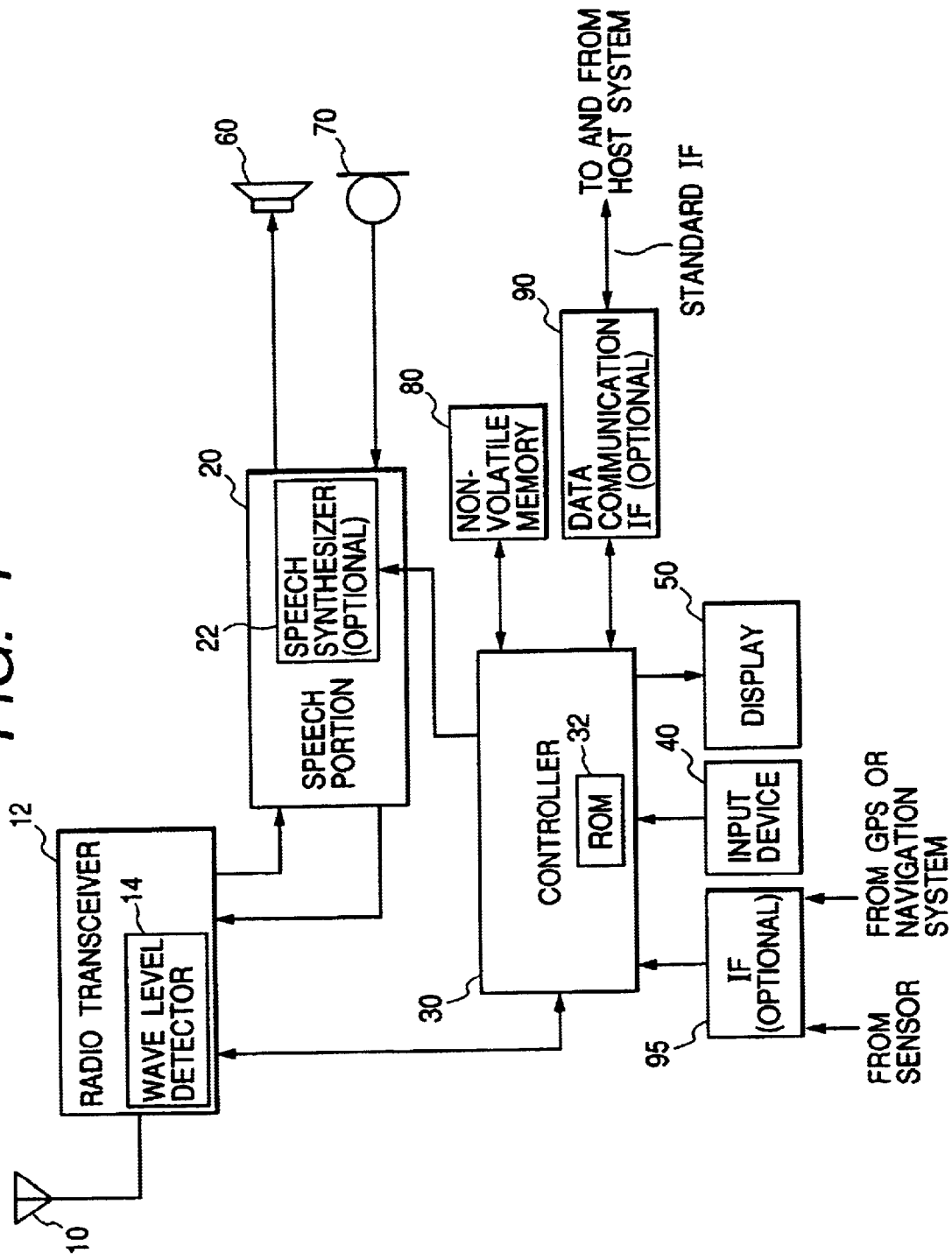
FIG. 1 is a schematic block diagram showing an arrangement of a cellular telephone set according to an illustrative embodiment of the invention.

FIG. 1 is a schematic block diagram showing an arrangement of a cellular telephone set according to an illustrative embodiment of the invention. In FIG. 1 the cellular telephone set 1 comprises an antenna 10, a radio transceiver 12, a speech portion 20 for processing speech signals between the user of this telephone set 1 and the communication opponent during a call, a controller 30 for controlling the overall operation of the telephone set 1, an input device 40 for permitting the user to input control data, a display device 50 for displaying information passed from the controller 30, a loudspeaker 60 for providing an audio output according to an audio signal from the speech portion 20, a microphone 70 for converting a user's voice into an audio signal passed to the speech portion 20 and a nonvolatile memory 80 for storing data such as a telephone directory table (detailed later). The radio transceiver 14 includes an electromagnetic wave level detector 14 for detecting the level of received electromagnetic wave signal. The speech portion 20 may optionally include a speech synthesizer 22 for synthesizing one of prepared messages for the user to inform the user of the current state of the cellular telephone set 1. If the cellular telephone set 1 is intended for mounting in a vehicle, the speech portion 20 preferably comprises a hands-free speech communication system.

The cellular telephone set 1 may further comprise a data communication interface (IF) 90 for enabling the telephone set 1 to communicate with an internal or external host system such as a microcomputer (not shown). The cellular telephone set 1 may be a part of a portable or laptop computer (not shown). If the telephone set 1 is not incorporated in such a laptop computer, the external interface (the opposite side of the side connected with the controller 30) of the data communication IF 90 is preferably a standard interface such as an RS-232C port. The controller 30 includes a read only memory (ROM) 32 for storing programs under the control of which the controller 30 operates.

The cellular telephone set 1 may further comprises an interface (IF) 95 through which the telephone set 1 can input data from, for example, a sensor (not shown) for detecting an operation of an air bag and/or a GPS (global positional system) receiver (not shown) or a car or personal navigation system (not shown). The cellular telephone set 1 and a GPS receiver or personal navigation system may be incorporated into a single system.

FIG. 2 is a diagram showing an example of a telephone directory table stored in the nonvolatile memory 80 of FIG. 1. In FIG. 2, the telephone directory table at least comprises an ID field that contains an ID (identifier) for identifying a person or party listed in the table and a telephone number field that contains at least one corresponding telephone number.

Figure 3A:
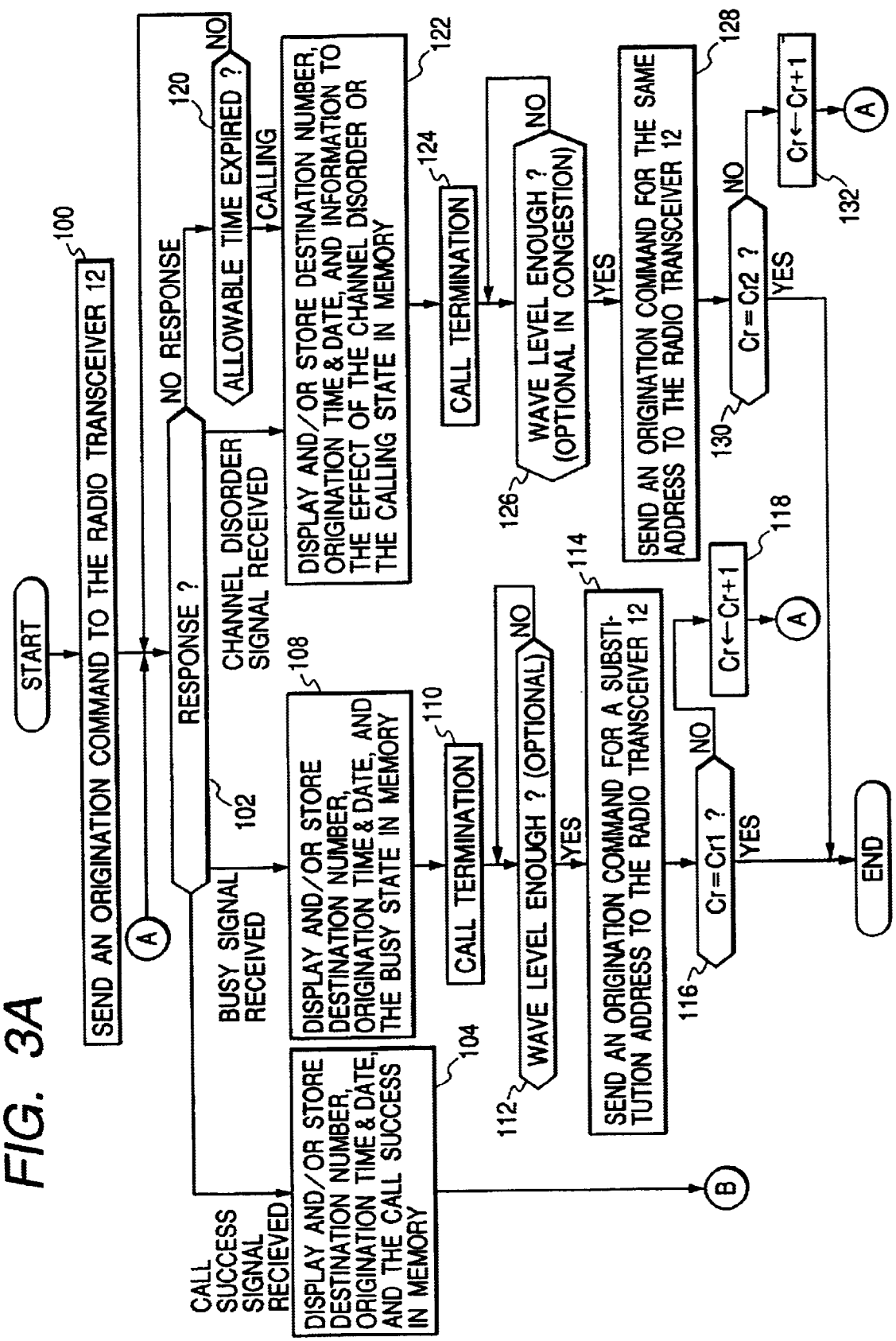
FIG. 3 is a flowchart showing an operation of the controller 30 under the control of programs (not shown) stored in ROM 32 and executed when a call is initiated and continues according to the principles of the invention.

FIG. 3A is a flowchart showing an operation of the controller 30 under the control of a call-origination program (not shown) stored in ROM 32 and executed when a call is initiated according to the principles of the invention. FIG. 3B is a flowchart showing an operation of the controller 30 under the control of a call-maintenance program (not shown) stored in ROM 32 executed during a call according to the principles of the invention. The call-origination program is invoked in response to a call-origination request for a specified address (or telephone number) from the input device 40, the not-shown sensor for detecting the operation of a not-shown air bag or the communication IF 90 (i.e., the host system connected with the IF 90). In FIG. 3, the flow ends terminated with an encircled letter "A" and "B" are to be interconnected with one another.

In FIG. 3A, step 100 sends a call-origination command for the specified (or destination) telephone number to the radio transceiver 12. Then, decision step 102 wait for a response from the transceiver 12. If a call success signal is received, the control is passed to step 104, where the controller 30 stores the destination telephone number, the origination time and date, and a code indicative of the call success in the nonvolatile memory 80. In this case, the controller 30 may display the stored information on the display device 50. Thereafter, the control is passed to step 140 of FIG. 3B.

If the controller 30 receives a busy signal from the radio transceiver 12 in step 102, then the control is passed to step 108, where the controller 30 stores the destination telephone number, the origination time and date, and a code indicative of the busy state in the nonvolatile memory 80. In this case, the controller 30 may display the stored information on the display device 50. Then, step 110 terminates the call-origination process. Step 112 makes a test to see if the received wave level is enough for a call (i.e., not less than a predetermined level), and wait till the received wave level becomes enough. If so, step 114 sends an origination command for a substitution telephone number, if any, or for the same telephone number, if not. Specifically, the controller 30 searches the telephone number field of the telephone directory table of FIG. 2 for the destination telephone number used in step 100 (the last called telephone number). If there are two or more telephone numbers in the found telephone number field (as shown in a record "BCDE" of the directory table of FIG. 2), then the controller 30 sends a call-origination command for a telephone number located next to the last called telephone number in the found telephone number field. Then, step 116 makes a test to see if a retrial counter (not shown) Cr equals a first preset retrial count Cr1. If so, then the call origination operation ends. Otherwise, the controller 30 increments the retrial counter Cr in step 118 to return to step 102.

In this way, if a destination or a called party has two or more telephone terminals and a called one of the telephone terminals is busy, the cellular telephone set 1 scans the telephones terminals one after another, which enable the user to be connected to a first released telephone terminal of the called party effectively.

It should be noted that step 112 may be omitted. It is especially true if the cellular telephone set 1 is of a type not mounted in a vehicle but carried by a person. This is because the radio wave reception conditions around the telephone set of such a type will change gradually.

If the controller 30 receives a channel disorder signal from the radio transceiver 12 in step 102 or if the controller 30 receives no response from the radio transceiver 12 for a time period exceeding an allowable time period in step 120, then the control is passed to step 122. The channel disorder signal is either a congestion signal indicative of the congestion of the communication channel leading to the destination or a weak wave signal indicative of the received wave signal being too weak for a call. In step 122, the controller 30 stores the destination telephone number, the origination time and date, and a code indicative of either the congestion or the weak wave (i.e., received wave level shortage) in the nonvolatile memory 80. Again, the controller 30 may display the stored information on the display device 50. Then, step 124 terminates the call-origination process. Step 126 makes a test to see if the received wave level is enough for a call (i.e., not less than the predetermined level), and wait till the received wave level becomes enough. If so, step 128 sends an origination command for the same telephone number as used in step 100. Then, step 130 makes a test to see if a retrial counter (not shown) Cr equals a second preset retrial count Cr2. If so, then the call-origination operation ends. Otherwise, the controller 30 increments the retrial counter Cr in step 132 to return to step 102.

In this way, if communication channels leading to the telephone terminal of the called telephone number is congested or if the level of the received wave signal is too weak to establish a connection, the cellular telephone set 1 waits till the wave signal level becomes enough for connection, and retries to originate a call to the same telephone number when the wave signal level becomes enough for connection.

It should be noted that the level checking step 126 might be omitted in case of the congestion of communication channels. It is also noted that the first and second preset retrial counts Cr1 and Cr2 may be either equal to or different from each other.

Once a call is established at step 104, then the control is passed to step 140 of FIG. 3B. Step 140 makes a test to see if a call termination signal is issued by the user pressing a predetermined button (not shown) of the input device 40. If so, then step 141 sends a control signal indicative of a call termination to the radio transceiver 12, executes a call termination process and ends the operation of FIG. 3B. Otherwise, step 142 makes another test to see if a waiting signal is received from the radio transceiver 12. If not, the control is passed to step 140. If a waiting signal is received in step 142, Then step 143 stores the destination telephone number, the origination time and date, and a code indicative of the call waiting state in the nonvolatile memory 80. Again, the controller 30 may display the stored information on the display device 50. Then, step 144 terminates the call-origination process. Step 145 makes a test to see if the received wave level is enough for a call (i.e., not less than a predetermined level), and wait till the received wave level becomes enough. If so, step 146 sends an origination command for the same telephone number as the last called telephone number, and ends the operation of FIG. 3B. Otherwise, the controller 30 waits till the received wave level becomes enough for a call.

In this way, if the connection between the user and the destination telephone terminal is disconnected due to weak wave, the cellular telephone set 1 waits till the wave signal level becomes enough for connection, and retries to originate a call to the same telephone number when the wave signal level becomes enough for connection.

In the above description, each of wave level checking steps 112, 126 and 145 may be replaced with steps 150 and 152 of FIG. 5. That is, as any of steps 112a, 126a and 145a, the controller 30 may obtain data indicative of the received wave signal level and store the data in the memory 80 in step 150; and make a test in step 152 to see if the received wave signal level is enough for a call (i.e., not less than the predetermined level), to proceed the following step if so or to return to step 150 otherwise.

The received wave signal level can be obtained from the wave level detector 14 in the radio transceiver 12. If the cellular telephone set 1 is incorporated with a GPS system or a navigation system, the decision of whether the received wave signal level is enough for a call may be made not by using the wave level detector 14 but by using the GPS or navigation system.

Specifically, if the GPS system is used, the controller 30 receives information on the number of satellites, satellite numbers, reception time and date, the position by longitude and latitude, etc. (and stores the information in memory 80 in step 150). The controller 30 makes the above decision according to the reception condition of the GPS system in step 112, 126, 145 or 152.

If the navigation system is used, the controller 30 receives information on the kind of the ground facility or the topography where the user is located (and stores the information in memory 80 in step 150). The controller 30 makes the above decision according to the received information and a list of kinds of ground facilities or topographies where radio waves are hard and/or easy to receive in step 112, 126, 145 or 152.

Alternatively, if the cellular telephone set 1 is of a vehicle-carried type that is not provided with a GPS or navigation system, then the cellular telephone set 1 may use an external GPS or navigation system.

The cellular telephone set 1 may be incorporated in a portable or laptop computer or host system (not shown). If a data transmission is to be achieved to or from an external or internal host system, the controller 30 preferably transfers requested data stored in the memory 80 to the external or internal host system as shown in steps 160 and 162 of FIG. 5 instead of displaying or storing the requested data in steps 104, 108, 122, 143 and 160.

The speech portion 20 may be provided with a speech synthesizer 22. This enables the call status-displaying and/or storing steps 104, 108, 122 and 143 to inform the user of the call status in voice.

After call termination steps 110, 124 and 144, timer routines may be inserted. In this case, the timer routines are preferably arranged such that the expiration time of each timer routine can be preset by the user.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of processing a call in a system comprising a cellular telephone, comprising:

executing a call origination for calling a destination telephone number in response to a request for said call origination;

executing a call termination process and retrying said call origination upon occurrence of a failure in said call origination;

stopping said retrying if a count of said call origination reaches a predetermined count value; and in response to a detection of disconnection of a current call after said call origination, wherein the disconnection is caused not by a user but by a channel disorder, executing a call termination process; and originating a new call for said destination telephone number of said current call.

2. The method of claim 1, further comprising delaying said retrying while a received wave level is less than a predetermined level.

3. The method of claim 1, wherein said failure is due to a busy state of a called telephone terminal identified by said destination telephone number, wherein said retrying aid call origination includes executing a call origination for substitution telephone number, which is at least one telephone number associated with a called party identified by said destination telephone number in a telephone directory table, said at least one telephone number being different from a last called telephone number.

4. The method of claim 2, further comprising means for detecting said received wave level, wherein putting off said retrying comprises obtaining said received wave level from said means for detecting said received wave level.

5. A method of processing a call in a system comprising a cellular telephone, comprising:

executing a call origination for calling a destination telephone number in response to a request for said call origination;

executing a call termination process and retrying said call origination upon occurrence of a failure in said call origination;

stopping said retrying if a count of said call origination reaches a predetermined count value; and delaying said retrying while a received wave level is less than a predetermined level, wherein the delaying said retrying comprises deciding whether said received wave level is less than said predetermined level, relative to a reception condition of GPS (global positioning system).

6. A method of processing a call in a system comprising a cellular telephone, comprising:

executing a call origination for calling a destination telephone number in response to a request for said call origination;

executing a call termination process and retrying said call origination upon occurrence of a failure in said call origination;

stopping said retrying if a count of said call origination reaches a predetermine count value; and delaying said retrying while a received wave level is less than a predetermined level, wherein the delaying said retrying comprise deciding whether said received wave level is less than said predetermined level, relative to information from a navigation system.

7. A cellular telephone apparatus capable of establishing and maintaining a call subject to a failure in call establishment, a busy state of a called party, or a communications channel disorder, the apparatus comprising:

means for executing a call origination for a destination telephone number in response to a request for said call origination;

means for automatically executing a call termination process in response to detection of a failure in said call origination;

means for automatically retrying said call origination in response to said call termination;

means for automatically delaying said retrying when a received wave level is less than a predetermined level; and means for automatically stopping said retrying if a count of said call origination reaches a predetermined count value.

8. The cellular telephone apparatus as defined in claim 7, further comprising:

means for responding to a detection of disconnection of a current call established by said call origination, said disconnection being used not by a user but by a channel disorder, and for executing a call termination process; and means for originating a new call for the same telephone number as a destination telephone number of said current call in response to said call termination process.

9. The cellular telephone apparatus as defined in claim 7, wherein said means for delaying said retrying comprises means for deciding whether said received wave level is less than said predetermined level, relative to a reception condition of a GPS (global positioning system).

10. The cellular telephone apparatus as defined in claim 7, further comprising:

means for detecting an operation of an air bag; and means for originating a call for a predetermined telephone number in response to said detecting said operation.

11. The cellular telephone apparatus as defined in claim 7, further comprising means for storing in memory, said destination telephone number, time and date of said call origination, and a code indicative of a call status.

12. The cellular telephone apparatus as defined in claim 7, further comprising means for displaying said destination telephone number, time and date of said call origination, and a code indicative of a call status.

13. The cellular telephone apparatus of claim 11, wherein said request for said call origination is made from a computer and wherein the cellular telephone apparatus further comprises means for transmitting said destination telephone number, said time and date of said call origination, and said call status, all in response to a request for transferring stored data from said computer.

14. A cellular telephone apparatus capable of establishing and maintaining a call subject to a failure in call establishment, a busy state of a called party, or a communications channel disorder, the apparatus comprising:

means for responding to a request for a call origination for a destination telephone number and for executing said call origination;

means for responding to a detection of a failure in said call origination and for executing a call termination process;

means for responding to said call termination and for retrying said call origination;

table means for associating each of prospective called parties with at least one telephone number;

means, operative in the event that said failure is due to a busy state of a called telephone terminal identified by said destination telephone number, for executing a call origination for a substitution telephone number, which is one of said at least one telephone number associated with a called party identified by said destination telephone number in said table means, said at east one number being different from a last called telephone number; and means for responding to a detection of disconnection of a current call after said call origination, wherein the disconnection is caused not by a user but by a channel disorder;

means for executing a call termination process; and means for originating a new call for said destination telephone number of said current call.

15. A portable system including a cellular telephone mean capable of establishing and maintaining a call subject to a failure in call establishment, a busy state of a called party, or a communications channel disorder, the cellular telephone mean comprising:

means for executing a call origination for a destination telephone number in response to a request for said call origination;

means for executing a call termination process in response to a detection of a failure in said call origination;

means for retrying said call origination in response to said call termination;

means for stopping said retrying if a count of said call origination reaches a predetermined count value; and means for responding to a detection of disconnection of a current call after said call origination, wherein the disconnection is caused not by a user but by a channel disorder;

means for executing a call termination process; and means for originating a new call for said destination telephone number of said current call.

16. A portable system including a cellular telephone means capable of establishing and maintaining a call subject to a failure in call establishment, a busy state of a called party, or a communications channel disorder, the cellular telephone means comprising:

means for executing a call origination for a destination telephone number in response to a request for said call origination;

means for executing a call termination process in response to a detection of a failure in said call origination;

means for retrying said call origination in response to said call termination;

means for stopping said retrying if a count of said call origination reaches a predetermined count value;

a CPU (central processing unit)-based portion; and means for enabling said computer and the cellular telephone means to communicate with each other, wherein said request for said call origination is made from said computer and wherein the cellular telephone mean further comprises means, responsive to a request for transferring stored data from said CPU-based portion, for transmitting said destination telephone number, time and date of said call origination, and a call status.

17. A portable system including a cellular telephone means capable of establishing and maintaining a call subject to a failure in call establishment, a busy state of a called party, or a communications channel disorder, the cellular telephone means comprising:

means for executing a call origination for a destination telephone number in response to a request for said call origination;

means for executing a call termination process in response to a detection of a failure in said call origination;

means for retrying said call origination in response to said call termination;

means for stopping said retrying if a count of said call origination reaches a predetermined count value;

a GPS (global positioning system) for receiving radio waves from plural satellites and outputting the quantity of said plural satellites, satellite numbers, reception time and data, and position data; and means for enabling said GPS and the cellular telephone means to communicate with each other, wherein said means for delaying said retrying comprises means for deciding whether said received wave level is less than said predetermined level, relative to a reception condition of said GPS.

18. A portable system including a cellular telephone means capable of establishing and maintaining a call subject to a failure in call establishment, a busy state of a called party, or a communications channel disorder, the cellular telephone means comprising:

means for executing a call origination for a destination telephone number in response to a request for said call origination;

means for executing a call termination process in response to a detection of a failure in said call origination;

means for retrying said call origination in response to said call termination;

means for stopping said retrying if a count of said call origination reaches a predetermined count value;

a navigation system for receiving radio waves from plural satellites and outputting information about a ground facility or a topography where the user is located; and means for enabling said navigation system and the cellular telephone means to communicate with each other, wherein said means for delaying said retrying comprises means for deciding whether said received wave level is less than said predetermined level, relative to said information from said navigation system.

* * * * *

UNITED STATES PATENT AND TRADEMARK OFFICE
CERTIFICATE OF CORRECTION

PATENT NO.   : 6,636,741 B2
DATED        : October 21, 2003
INVENTOR(S)  : Kenji Yoshioka et al.

It is certified that error appears in the above-identified patent and that said Letters Patent is hereby corrected as shown below:

<u>Column 6,</u>
Line 43, change "aid" to -- said --.

Signed and Sealed this

Thirtieth Day of December, 2003

JAMES E. ROGAN
*Director of the United States Patent and Trademark Office*